Nov. 7, 1944.    W. MELIN    2,362,288
FIXTURE FOR MACHINE TOOLS
Filed Jan. 19, 1942    2 Sheets-Sheet 1

Inventor
William Melin
By Barthel & Bugbee
Attorneys

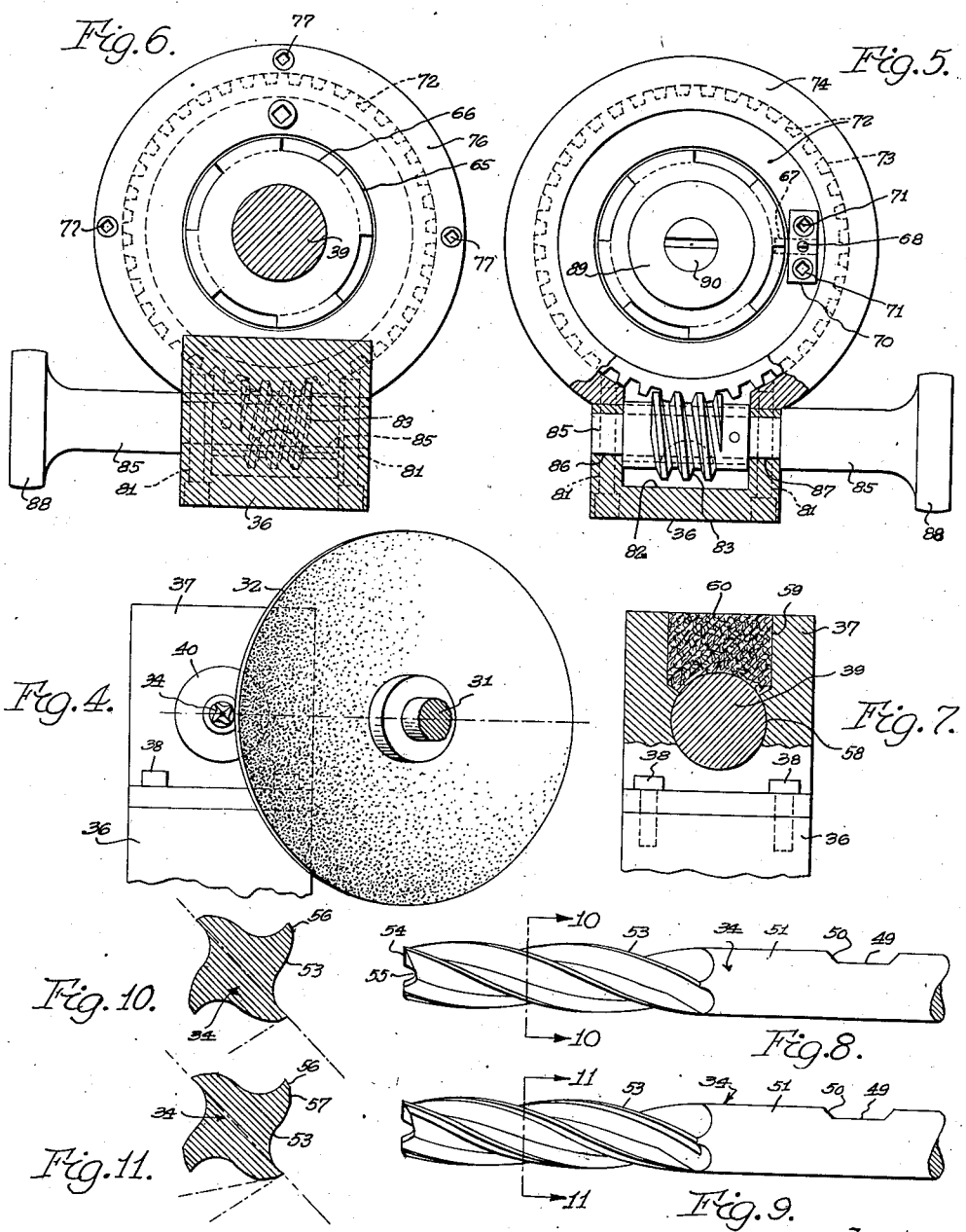

Patented Nov. 7, 1944

2,362,288

UNITED STATES PATENT OFFICE 2,362,288

FIXTURE FOR MACHINE TOOLS

William Melin, Detroit, Mich.

Application January 19, 1942, Serial No. 427,277

6 Claims. (Cl. 51—225)

This invention relates to machine tools and, in particular, to work-supporting fixtures for milling and grinding machines, especially for the production of spirally fluted workpieces.

One object of this invention is to provide a work-supporting fixture for machine tools having means for spirally rotating the work-holder along a predetermined path, with means for adjustably varying the position of a given point in the spiral path so as to vary the positions of the flutes on the workpiece relatively to the cutter or grinding wheel.

Another object is to provide a work-supporting fixture for machine tools having a workholder with a spiral groove engaged by a projection which is adjustable arcuately around the axis of the spiral groove so as to adjust the position of the work-holder relatively to the cutter or grinding wheel for different batches of fluted workpieces.

Another object is to provide a work-supporting fixture as set forth in the preceding object wherein the projection is mounted upon an arcuate toothed member meshing with a corresponding toothed adjusting member for precisely positioning the projection around the axis of rotation of the work-holder.

Another object is to provide a work-supporting fixture consisting of a spirally grooved spindle mounted for spiral rotary movement and having a projection engageable with the groove and mounted upon an annular worm gear engaged by a worm for adjusting the projection arcuately around the axis of rotation of the spindle.

Another object is to provide a work-supporting fixture consisting of a spirally movable spindle mounted in spaced bearings relatively to the cutter or grinding wheel, these bearings having passageways leading outwardly from the spindle bores therein and containing wiping members of yieldable material which not only wipe the spindle free of the abrasive dust from the grinding wheel but also optionally serve as wicks for conveying lubricant to the bearings.

In the drawings:

Fig. 4 is a left-hand end elevation of Fig. 1.

Fig 5 is a right-hand end elevation of Fig. 1.

Fig. 6 is a cross-section along the line 6—6 in Fig. 2.

Fig. 7 is a section along the line 7—7 in Fig. 1, with a spindle bearing broken away to disclose the wiping member.

Fig. 8 is a side elevation of a fluted work-piece, such as an end mill, prior to being ground while held in the work-supporting fixture of the present invention.

Fig. 9 is a view similar to Fig. 8, but showing the work-piece after it has been ground in the work-supporting fixture of the present invention.

Fig. 10 is a cross-section through the unground work-piece, taken along the line 10—10 in Fig. 8.

Fig. 11 is a cross-section through the ground work-piece, taken along the line 11—11 in Fig. 9.

General arrangement

Figures 1, 2, 3:
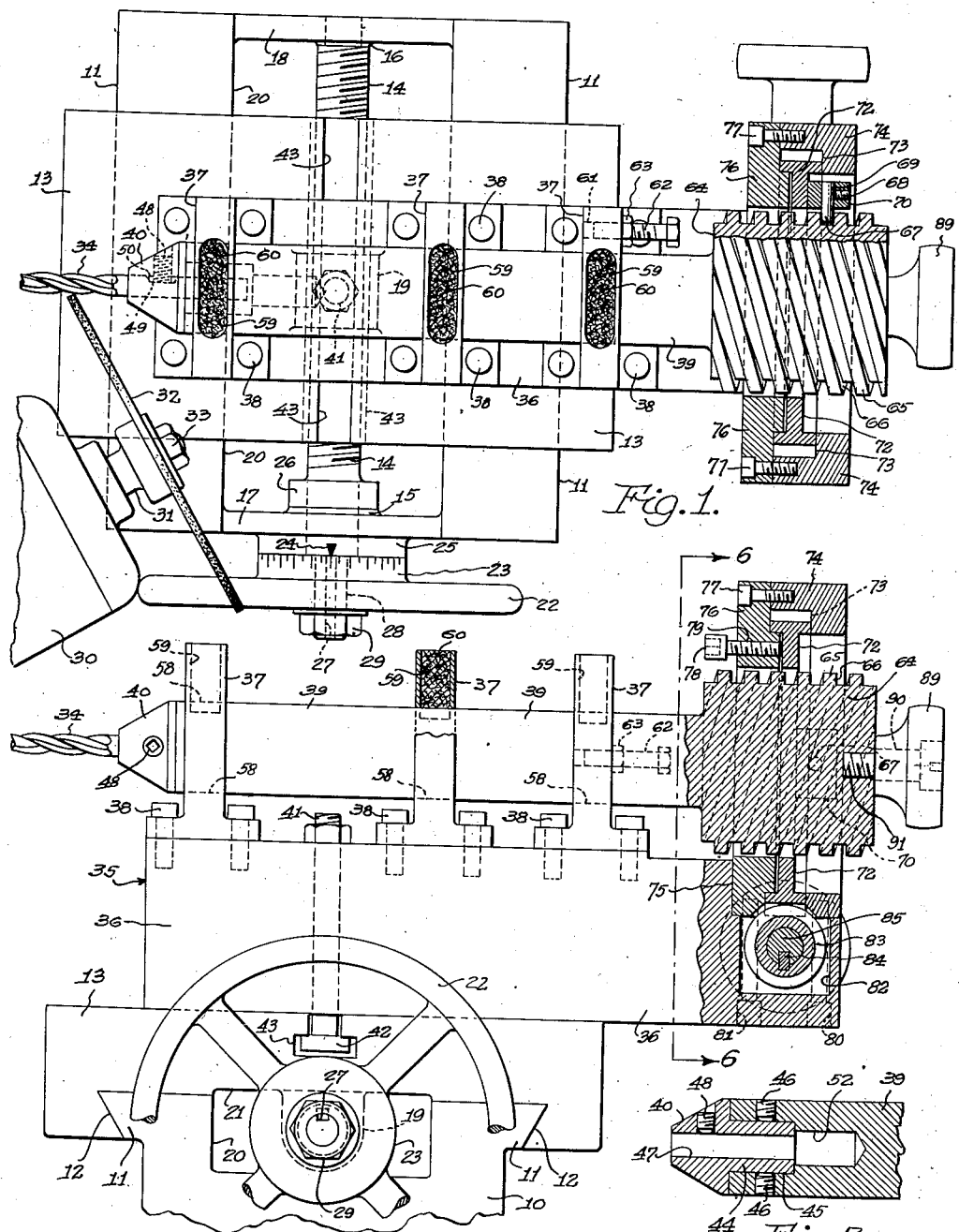
Fig. 1 is a top plan view partly in section of a preferred embodiment of the work-supporting fixture for machine tools, according to the invention.
Fig. 2 is a front elevation of the fixture shown in Fig. 1, also partially in section.
Fig. 3 is a longitudinal section through the forward end of the work-holding spindle shown in Fig. 1.

In general, the work-supporting fixture of the present invention consists of a longitudinally movable and rotatable spindle or arbor having an adapter in one end thereof for receiving and holding a work-piece, such as a fluted tool, while the latter is being ground by a grinding wheel or machined by a cutter. The spindle or arbor is mounted in spaced bearings having chambers therein for receiving wiping material which presses against the spindle or arbor and wipes its surface free from the abrasive dust from the grinding wheel or metal particles from the workpiece. The wiping material is preferably porous and absorptive so that it may hold the particles harmlessly and reduce wear upon the spindle or bearing. The porous material may optionally serve as a wick for conducting lubricant to the bearings, thus lubricating the spindle or arbor as well as wiping it free from abrasive dust or metal particles.

The arbor or spindle is provided with a spiral groove which is engaged by a finger mounted in a ring gear coaxial with the axis of the spindle. The ring gear in turn is mounted in an annular support and engaged by a worm having an adjusting handle connected thereto. The spindle at its outer end carries an operating handle.

The bed upon which the fixture is mounted is secured to the carriage of the machine tool and so adjusted relatively to the grinding wheel as to be properly positioned when a spirally fluted workpiece, such as an end mill, is placed in the adapter. (Fig. 1.) The rotation of the worm by its handle enables the flute of the workpiece to be positioned accurately relatively to the grinding wheel or cutter, especially when different batches of workpieces are received. The rotation of the spindle by its handle causes the spindle to move longitudinally along its axis, carrying the ridge of the flute of the workpiece accurately past the edge of the grinding wheel or cutter, thus machining it accurately.

Machine construction

Referring to the drawings in detail, Figs. 1 and 2 show a machine tool, such as a grinding machine, having a saddle 10 which is vertically adjustable relatively to the bed of the machine (not shown) by conventional means (not shown). The saddle 10 is provided with ways 11 coacting with a dovetailed groove 12 in the work table or carriage 13 of the machine. A screw shaft 14 mounted in bearings 15 and 16 in the bridge portions 17 and 18 of the saddle 10 engages the threaded nut 19 which traverses the recess 20 between the opposite ways 11 and is secured to the underside 21 of the carriage 13. The screw shaft 14 at its outer end carries a hand wheel 22 having a micrometer drum 23 adjacent an index pointer 24 on a boss 25 projecting from the saddle 10, a collar 26 mounted on the screw shaft 14 holding the latter in assembly. The handwheel 22 is keyed as at 27 to reduce diameter portion 28 of the screw shaft 14 and secured in position by the nut 29 threaded thereon. By rotating the handwheel 22, the carriage 13 may thus be caused to move to and fro along the ways 11.

Also mounted upon the bed of the machine (not shown) is a motor 30 having a shaft 31 to which a grinding wheel 32 is secured, as by the bolt 33. Optionally the motor 30 may be replaced by a grinding head driven by a more remotely located source of power. The motor or grinding head 30 may be swivelled by conventional means so as to vary the position of the grinding wheel 32 relatively to the workpiece 34.

Work-supporting fixture construction

The work-supporting fixture, generally designated 35, consists of a base 36, bearing brackets 37 bolted as at 38 at intervals thereon and carrying a spindle or arbor 39 having an adapter 40 in the end thereof for accommodating the workpiece 34. The base 36 is secured to the carriage 13 by the bolt 41 having its head 42 anchored in the T-slot 43 in the carriage 13.

The adapter 40 (Fig. 3) is provided with a reduced diameter portion 44 secured within the axial bore 45 by the set screws 46. The workpiece 34 is secured within the axial bore 47 by a set screw 48 the end of which engages the flat portion 49 of a groove 50 (Figs. 8 and 9) in the shank 51. A socket 52 in the end of the spindle 39 (Fig. 3) receives the end of the shank 51. The workpiece 34 is provided with flutes or spiral ridges 53 which terminate in cutting lips 54 on the end thereof separated from one another by the central recess 55. (Figs. 8 and 9.) The flute 53 is provided with an edge surface 56 which is backed off as at 57 (Fig. 11) by grinding with the aid of the fixture of the present invention.

The bearing brackets 37 are provided with aligned bores 58 (Fig. 7) through which the spindle or arbor 39 passes. A passageway 59 extends from the bore 58 outwardly and upwardly to the top of the bearing bracket 37. This passageway is filled with a wiping material 60, such as a piece of felt, the lower surface of which engages the surface of the arbor or spindle 39, which is accurately ground. The wiping material 60 is also preferably employed as a wick for holding and conducting lubricant for lubricating the bearing bores 58. One of the bearing brackets 37 is provided with a threaded hole 61 into which is threaded a stop bolt 62 locked in position by a lock nut 63 (Fig. 1).

The outer end of the spindle or arbor 39 is enlarged as at 64 and this enlargement is provided with spiral ridges 65 having spiral grooves 66 therebetween. The spiral grooves 66 are engaged by the end of a pin 67 (Fig. 1) secured as at 68 in a bore 69 of a bracket 70 bolted as at 71 to the face of a gear 72. The latter is mounted in the groove 73 of the annular bracket 74 secured in the recess 75 in the bed 36 (Fig. 2). The gear 72 is held in position by the retaining ring 76 bolted as at 77 to the annular bracket 74. An adjusting screw 78 is threaded through a bore 79 in the annular bracket 74 parallel to the axis of the spindle 39 and engages the inner face of the gear 72. The annular bracket 74 is secured in the recess 75 by the bolts 80 passing upwardly through the base 36, and the retaining ring 76 is likewise similarly bolted thereto as at 81. At this location the base 36 is provided with a recess 82 extending transversely thereacross beneath the gear 72.

Mounted in the recess 82 and meshing with the gear 72 is a worm 83 keyed as at 84 (Fig. 2) to a shaft 85 which is journaled in the bores 86 and 87 on opposite sides of the base 36. One end of the shaft 85 carries a hand wheel 88 by which the shaft 85 and worm 83 may be rotated, thereby rotating the gear 72 and swinging the pin 76 in an arcuate path around the spindle or arbor 39. Mounted on the outer end of the arbor 39 is a hand wheel 89, secured thereto by the stud screw 90 having its inner end threaded into the bore 91 in the end of the arbor or spindle 39.

Operation

In the operation of the invention, the saddle 10 is adjusted up or down and the carriage 13 in or out until the workpiece 34 is properly positioned relatively to the grinding wheel 32, which has also been swivelled so as to be tilted at the proper angle (Fig. 1). A workpiece 34 is secured by the set screw 48 in the bore 47 of the adapter 40. The arbor or spindle 39 is rotated by the handwheel 89 and simultaneously moved axially by the engagement of the spiral grooves 66 with the pin 67.

The handwheel 88 upon the worm shaft 85 is now rotated in cooperation with the handwheel 89 on the spindle or arbor 39 until the edge 56 on a flute 53 of the workpiece 34 is properly presented to the edge of the grinding wheel 32. The rotation of the handwheel 88 moves the pin 67 in an arcuate path and thereby shifts the arbor 39 longitudinally for a given point in one of the grooves 66.

With the machine and fixture thus properly adjusted, the hand wheel 22 is now rotated to feed the workpiece 34 into engagement with the rotating grinding wheel 32. The handwheel 89 is now turned so that the flute 53 moves spirally along the edge of the grinding wheel 32, grinding the spiral portion 57 thereon. (Fig. 11.) When one of the flutes 53 has thus been ground, the handwheel 89 is rotated in the reverse direction until the spiral groove 66 is completely freed from and passes beyond the pin 67 whereupon the operator enters the latter in the end of another of the spiral grooves 66 and turns the hand wheel 89 to feed another of the flutes 53 into engagement with the grinding wheel 32. This is repeated until each of the flutes 53 in turn has been brought into engagement with the grinding wheel 32 and thus ground.

The workpieces 34 of a given batch will ordinarily have the flat spots 49 located in the same positions relatively to the flutes 53. Occasionally, however, the production of a new batch or run of several hundred workpieces will cause the flat spot 49 to vary slightly relatively to the flutes 53. The latter, however, can be brought into proper engagement with the grinding wheel 32 merely by rotating the handwheel 88 in order to swing the adjusting pin 67 up or down in an arcuate path.

Meanwhile the wiping material 60 is occasionally removed from the recesses 59 and the abrasive dust cleaned off the end thereof which is in contact with the surface of the arbor 39. The material 60 is also oiled occasionally to provide an oil film for the arbor 39, thus facilitating its rotation and sliding motion.

While a specific embodiment of the invention has been described and illustrated, it will be understood that various modifications may be made within the scope of the appended claims without departing from the spirit of the invention.

What I claim is:

1. A work-supporting fixture for a machine tool comprising a base plate, bearing means on said base plate, a spindle supported in said bearing means for rotary and lengthwise movement, a series of spiral grooves on said spindle, a single guide projection engageable with one of said spiral grooves manual means for selectively moving one of said spiral grooves into engagement with said projection, and means for adjustably and arcuately moving said projection about said spindle.

2. A work-supporting fixture for a machine tool comprising a base plate, bearing means on said base plate, a spindle supported in said bearing means for rotary and lengthwise movement, a series of spiral grooves on said spindle, a single indexing projection for engaging one of said spiral grooves manual means for selectively moving one of said spiral grooves into engagement with said projection, a circular toothed member mounted for movement in an arcuate path and carrying said projection, and a gear engaging said circular toothed member for moving said toothed member and projection about the axis of said spindle.

3. A work-supporting fixture for a machine tool comprising a base plate, bearing means on said base plate, a spindle supported in said bearing means for rotary and lengthwise movement, a series of spiral grooves on one end of said spindle, a single projection for engaging one of said spiral grooves manual means for selectively moving one of said spiral grooves into engagement with said projection, an arcuate gear carrying said projection, and an adjusting gear meshing with said arcuate gear for arcuately moving said projection about the axis of said spindle.

4. A work-supporting fixture for a machine tool comprising a base plate, bearing means on said base plate, a spindle supported in said bearing means for rotary and lengthwise movement, a series of spiral grooves on said spindle, a single projection for engaging one of said spiral grooves manual means for selectively moving one of said spiral grooves into engagement with said projection, an arcuate worm gear encircling said shaft and carrying said projection, and an adjusting worm rotatably carried by said base meshing with said worm gear for independently adjusting the position of said projection about the axis of said spindle.

5. A work-supporting fixture for a machine tool comprising a base plate, bearing means on said base plate, a spindle supported in said bearing means for rotary and lengthwise movement, a series of spiral grooves on said spindle, a single projection for selectively engaging one of said spiral grooves, manual means for disengaging the selected spiral grooves from the projection and to progressively position another spiral groove in feed contact with said projection a ring gear coaxially mounted relatively to said spindle and carrying said projection, and an adjusting gear rotatably carried by said base and meshing with said ring gear for arcuately moving said projection in a circular path about the axis of said spindle.

6. A work-supporting fixture for a machine tool comprising a base plate, bearing means on said base plate, a spindle supported in said bearing means for rotary and lengthwise movement, a series of spiral grooves on said spindle, a single projection for selectively engaging one of said spiral grooves, manual means for moving the spiral grooves progressively into and out of engagement with the projection a ring gear coaxially mounted relatively to said spindle and carrying said projection, and an adjusting worm rotatably carried by said base and meshing with said ring gear for arcuately moving said projection in a circular path about the axis of said spindle.

WILLIAM MELIN.